Patented Nov. 25, 1930

1,783,013

UNITED STATES PATENT OFFICE

J BIRCHARD GREEN, OF CHICAGO, ILLINOIS, ASSIGNOR TO FRANKLIN M. WARDEN, OF CHICAGO, ILLINOIS

ROD FOR USE IN ARC WELDING OR CUTTING

No Drawing.  Application filed February 10, 1927. Serial No. 167,377.

The object of my invention is to provide materials for filler rod coatings as used in arc welding and cutting for stabilizing the arc. Such materials need not necessarily be on the surface of the filler material.

I have discovered that uranium compounds possess a marked stabilizing action. I prefer to use a mixture of uranium oxide, 24 parts by weight, and sodium tungstate, 13 parts by weight, with sufficient water to give a syrupy consistency, the water drying out after application to the filler material. Compounds of uranium oxide other than uranium oxide are likewise effective, but some necessitate the use of larger quantities.

The tungsten compound hydrolyzes in water, becoming so adhesive that it will itself adhere firmly to the filler material and will also act as a binder for a considerable mass of other material. It will also thin the resultant slag from the uranium compound.

Metallic arc electrodes coated with suitable uranium compounds give an extremely steady arc, probably the most steady that can be obtained by the introduction of any added material into the arc with the electrode. Furthermore, these compounds, aside from stabilizing the arc, perform other desirable arc functions.

I claim:

1. In a coating for filler material as used in fusion welding and cutting, a tungsten oxide compound and a uranium oxide compound.

2. In a coating for filler material as used in fusion welding and cutting, a tungsten oxide compound and an oxide compound of another metal of the sixth periodic group.

3. In a coating for filler material as used in fusion welding and cutting, a uranium oxide compound and an oxide compound of another metal of the sixth periodic group.

4. A coating for filler material as used in fusion welding and cutting containing uranium and tungsten oxide compounds of such a thickness as will result from dipping the filler material in a water bath of syrupy consistency containing uranium oxide and sodium tungstate and then drying.

5. A coating for filler material as used in fusion welding and cutting containing uranium and tungsten oxide compounds, of such a thickness as will result from dipping the filler material in a water bath of syrupy consistency containing uranium oxide and sodium tungstate in the ratio of about 2 to 1 by weight and then drying.

6. Filler material for arc welding and cutting provided with a weld assisting coating containing about 24 parts by weight of uranium oxide and about 13 parts by weight of sodium tungstate.

7. A metallic arc electrode provided with a weld assisting coating containing about 24 parts by weight of a uranium oxide compound and about 13 parts by weight of a tungsten oxide compound.

8. A combination of a ferrous arc electrode and a weld assisting coating, said coating containing a uranium oxide compound and a tungsten oxide compound, about two parts of the uranium oxide compound being used to about every one part of the tungsten oxide compound.

In testimony whereof I have hereunto subscribed my name.

J BIRCHARD GREEN.